Nov. 4, 1952 R. J. DONOVAN 2,616,343
FOCUSING CAMERA WITH PARALLAX CORRECTING VIEW FINDER
Filed July 8, 1950 2 SHEETS—SHEET 1

INVENTOR.
RICHARD J. DONOVAN
BY
ATTORNEY

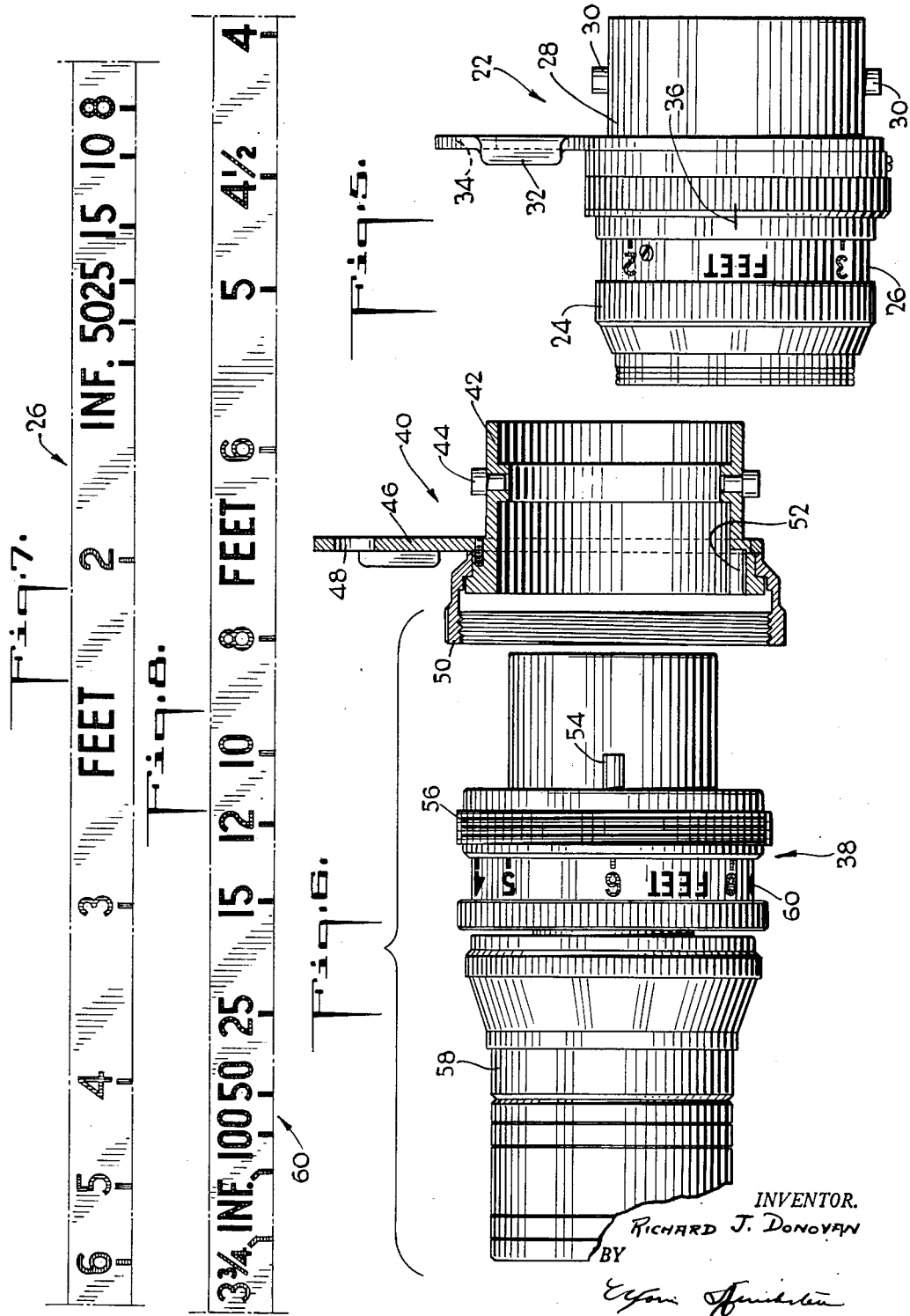

Patented Nov. 4, 1952

2,616,343

UNITED STATES PATENT OFFICE 2,616,343

FOCUSING CAMERA WITH PARALLAX CORRECTING VIEW FINDER

Richard J. Donovan, Chula Vista, Calif.

Application July 8, 1950, Serial No. 172,755

1 Claim. (Cl. 95—44)

This invention relates to focussing cameras and, more particularly, is concerned with view finders for focussing cameras.

By way of example my invention is described herein with respect to a focussing moving picture camera having interchangeable lenses, the invention being particularly well suited for this purpose. However, it is to be understood that this specific form of my invention is only to be considered as illustrative and my invention is not to be deemed as limited thereby, except to the extent to which features of such embodiment are incorporated in the appended claim.

It is well known that in a conventional view finder whose optical axis is offset from the optical system of a camera, that is to say, in a view finder which does not employ the optical system of the camera, the center of the area framed by the view finder does not register exactly with the center of the area framed by the optical system of the camera. Due to this off-set the center of the area framed by the view finder will be above, to one side, or below the center of the area framed by the camera, depending upon what position the view finder occupies with respect to the camera axis. This discrepancy is generally known as "parallax."

When the principal object of interest in a picture is at a substantial distance from the camera, parallax is not noticeable; but as the principal object approaches the camera, a point finally is reached where parallax creates a marked difference between the picture seen in the view finder and the picture taken. This distance is a function of the view finder offset and the focal length of the lens employed in the camera. For example, in a present day standard Eastman Cine Kodak 16 mm. moving picture camera, with a 25 mm. f/1.9 lens and a built-in view finder offset from the camera axis about three inches, parallax becomes objectionable when the principal object is at about five feet from the camera and at this point, a proper compensating correction should be made.

The commonest and simplest correction, and the one which presently is most widely used, is a parallax compensating marker in the view finder. When the object is at a distance from the camera greater than would require correction for parallax, the top of the view finder frame is considered to be the top of the picture viewed. When the principal object being photographed is within a certain specified distance, the top of the picture viewed is considered to be at the parallax compensating marker, this being below the top of the view finder frame. Thereby the camera is tilted slightly in a direction toward the view finder so as to correct for parallax.

Users of amateur focussing cameras do not regularly employ the parallax compensating marker and, as a result, there is a tendency to forget the point at which correction for parallax should be called into play.

This situation is aggravated by two other factors. It often is desirable to have multiple parallax compensating markers which successively are called into use as the principal object in a scene being photographed approaches closer and closer to the camera. Moreover, many cameras with parallax compensating markers have interchangeable focussing lenses. As has been noted earlier, the points at which parallax corrections are made are functions of the focal lengths of the lenses, so that every time a lens having a different focal length is inserted in the camera, the parallax compensating markers must be employed at different distances of the principal object from the camera. Therefore, in addition to the single distance that should be remembered for the oftenest used lens and a single parallax compensating marker, the amateur photographer must recall, usually on the spur of the moment, a large number of distances for different focal length lenses and different parallax compensating markers. This condition leads to confusion, parallax errors and a reluctance to take close-ups.

It is an object of my invention to provide a combination of focussing lens and view finder which overcomes the foregoing disadvantages.

It is another object of my invention to provide a combination of a focussing camera and view finder which are so mutually related that a user will have no difficulty in determining when the first parallax correction is to be made or, if a second parallax correction is needed, when that is to be effected.

Another object of my invention is to provide in combination a set of interchangeable focussing lenses and a view finder which are so mutually related that regardless of which lens is employed, a user readily can ascertain when one or more parallax corrections should be brought into play.

Other objects of my invention will in part be obvious and in part will be pointed out hereinafter.

My invention accordingly consists in the features of construction, combinations of elements and arrangements of parts which will be exemplified in the device hereinafter described and of which the scope of application will be indicated in the appended claim.

In the accompanying drawings in which is shown one of the various possible embodiments of my invention, Fig. 1 is a perspective view of a home motion picture camera embodying my invention, and of the type adapted to employ one of a plurality of objective lenses having different focal lengths;

Fig. 5 is a side view of an objective lens and lens mount designed to be detachably coupled to the camera shown in Fig. 1;

Fig. 6 is a view similar to Fig. 5 of another objective lens and lens mount designed to be detachably coupled to said camera, said mount being illustrated together with its adapter which is shown in section;

Fig. 7 is a developed view of the footage scale of the lens shown in Fig. 5; and Fig. 8 is a developed view of the footage scale of the lens and lens mount shown in Fig. 6.

Figure 1:
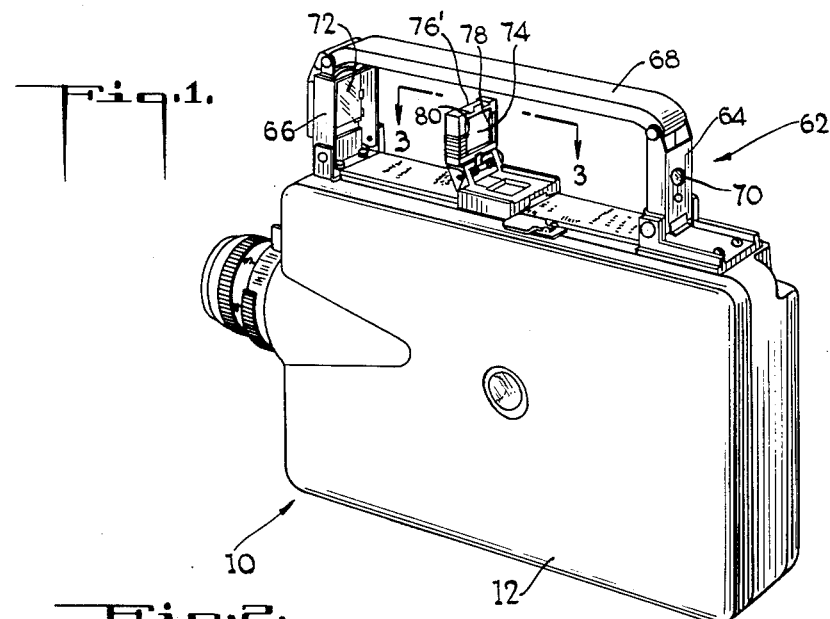
Figure 2:
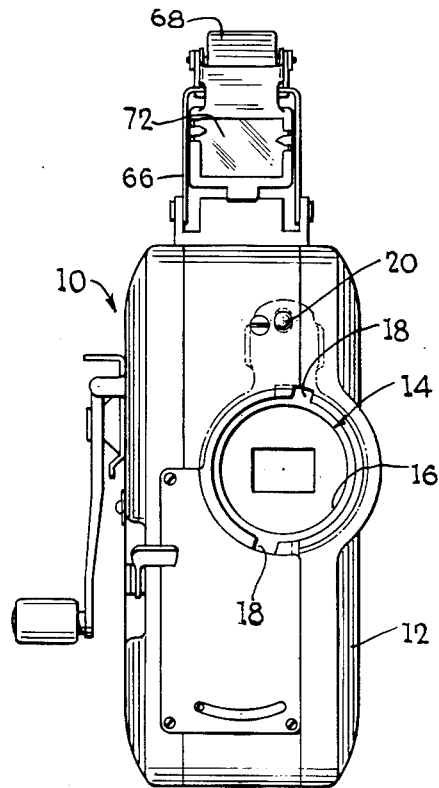
Fig. 2 is a front view of the camera shown in Fig. 1.
Figure 3:
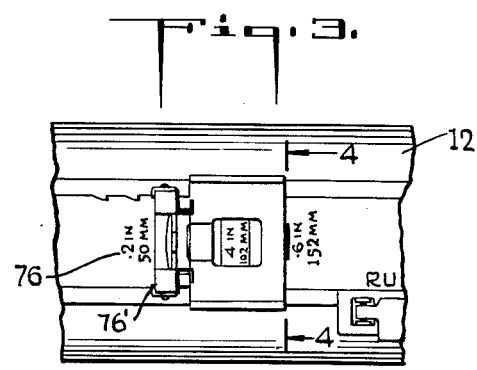
Fig. 3 is an enlarged fragmentary sectional view taken substantially along the line 3—3 of Fig. 1, the same being illustrative of the appearance of the slidable mount for one of the view finding lenses.
Figure 4:
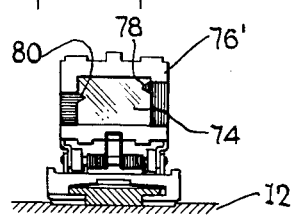
Fig. 4 is a sectional view taken substantially along the line 4—4 of Fig. 3.

Referring now in detail to the drawings, the reference numeral 10 denotes a standard 16 mm. Eastman Cine Kodak motion picture camera including a casing 12 within which are housed conventional motion picture film-handling camera mechanisms. On the front of the casing there is provided a lens socket 14 of any well known type constituting for example a cylindrical tube 16 having a pair of bayonet slots 18 which open on the front edge of the tube. The front of the camera also includes a forwardly extending spring-loaded stud 20.

A typical removable objective lens and lens mount 22 is shown in Fig. 5. This lens, by way of example, is a standard 25 mm. lens and is housed in a barrel 24 carrying a footage scale 26, shown developed and enlarged in Fig. 7. The barrel is rotatably secured in a cylinder 28 as by means of matching screw threads so that as the barrel is turned, the lens will be moved toward or away from the cylinder. As is well known, the screw threads are of such pitch that when the barrel is rotated through approximately 360°, the lens will be moved a distance along its optical axis sufficient to change focus from objects at infinity to objects at one-half the hyperfocal distance.

The cylinder includes two diametrically opposite radially extending pins 30 which are adapted to be received in the bayonet slots 18 when the cylinder is nested in the socket 14. The cylinder further includes a radially extending tab 32 having an opening 34 adapted to receive the stud 20 in a conventional manner. Moreover the cylinder includes an index marker 36 against which the footage scale is designed to be read.

Another removable lens and lens mount 38 is illustrated in Fig. 6. Said lens has a focal length of 76 mm. and like the other long focal length lenses is designed to be used with an adapter 40. Said adapter includes a cylinder 42 having diametrically opposed radially extending pins 44 designed to engage the slots 18. The cylinder further includes a radially extending tab 46 having an opening 48 in which the stud 20 is received. For the purpose of engaging the lens tube the adapter is provided with an internally threaded rotatable captive ring 50 at its forward end and a fixed half-round slot 52 behind the said ring.

The lens mount includes a pilot pin 54 that is designed to be slidably received in the slot 52 in order to properly orient a male threaded collar 56 with respect to the adapter. Said collar 56 is designed to be threadably engaged by the adapter ring 50. The forward portion of the lens mount constitutes a lens barrel 58 rotatably mounted with respect to the collar 56 and designed to be turned relative thereto for the purpose of shifting the lens along the optical axis of the camera. The lens barrel includes a footage scale 60, a developed view of which is illustrated in Fig. 8. This scale is read against an index mark (not shown) on the collar.

The camera is provided with a view finder 62 which is conventional in all respects except for the parallax compensating top frame markers. Thus, said view finder includes a pair of finder brackets 64, 66 which are hinged to the top of the camera casing 12 and have a handle 68 pivotally secured to their outer ends.

The rear bracket 64 carries a viewing lens 70 and the front bracket 66 carries an object lens 72, this latter lens being pivotally mounted on said bracket so that, if desired, it can be swung out of the way. A sliding lens 74 is disposed on top of the camera casing between the viewing lens and the object lens.

The foregoing view finder is substantially the same as the view finder shown in United States Letters Patent No. 2,043,900, issued June 9, 1936. In a view finder of this type, the field of view is varied by movement of the sliding lens, and for a field of view of the camera for each different interchangeable lens a position can be found for the sliding lens which will give a corresponding field of view in the view finder. These positions are appropriately marked as by symbols 76 on the top of the camera casing.

It may be observed that where a wide angle objective lens for the camera is employed, the object lens 72 for the view finder is swung out of the way as is fully explained in said Letters Patent.

The frame 76' for the sliding lens 74 carries a pair of parallax compensating top frame markers 78, 80. Each of these includes a pointer or the like extending inwardly of the field of view at opposite sides of the frame. In accordance with accepted practice, when the principal object being photographed approaches close to the camera, the camera is tilted so that one or the other of the parallax compensating top frame markers is employed for the top of the field of view. As pointed out heretofore, the distance from the principal object to the camera and the focal length of the lens determines which top frame marker is to be used and when a marker is to be used. Pursuant to my invention, I avoid the necessity of having the user of a camera memorize several arbitrary distances (two for each of the different interchangeable lenses). This is done by imparting a characterizing color to the parallax compensating top frame markers. Where as here, there are two parallax compensating top frame markers at different heights, each top frame marker has a different characterizing color. For example, the higher parallax compensating top frame marker 78 has at least the surface thereof which faces the viewing lens colored red and the corresponding surface of the lower top frame marker 80 is colored blue. To more readily differentiate the top frame markers, I additionally color the side of the frame to the same characterizing color as the associated top frame marker.

The footage scale of each of the different interchangeable lens barrels has its footage indicia colored in groups to correspond with the color of the parallax compensating top frame markers; that is to say, all the footage indicia on a given lens within the footage range at which the upper parallax compensating top frame marker should be used with said lens are colored red, this being the same color as the upper parallax compensating top frame marker. All the footage indicia on the same lens within the footage range at which the lower parallax compensating top frame marker should be used with said lens are colored blue, this being the same color as the lower parallax compensating top frame marker. The balance of the footage indicia are uncolored or are colored with a characterizing color distinctly different from the characterizing colors of the parallax compensating top frame markers. For example, all such markings here are shown as colored black.

More specifically, with the 25 mm. camera lens 22 in a camera such as shown, the upper parallax compensating top frame marker should come into use when the principal object being photographed is five feet away from the camera and should be used as the top of the field of view in the view finder up to three feet. The lower parallax compensating top frame marker comes into use with such a lens at two feet. Accordingly, the indicia "5," "4" and "3" are colored red on the lens barrel and the footage indicia "2" is colored blue.

When the 76 mm. lens 38 is used in the camera 10, the upper parallax compensating top frame marker is supposed to be used at distances of from ten to six feet and the lower parallax compensating top frame marker at from distances of five to three and three-quarter feet. In accordance with my invention, therefore, the footage indicia "10," "8" and "6" are colored red and the footage indicia "5," "4½," "4" and "3¾" are colored blue.

If desired, the spaces between the indicia on the footage scale additionally or alternatively may have the appropriate characterizing colors imparted thereto.

When using the camera, an operator gauges the distance away from the camera of the principal object to be photographed and rotates the lens barrel until the index marker is at a point on the footage scale corresponding to this distance. As he thus sets the barrel, the color of the closest footage indicium will be apparent and he employs a parallax compensating top frame marker having this color when using the view finder. Should the closest footage indicium have the color of neither of the parallax compensating top frame markers, the operator uses the entire viewing frame.

It thus will be seen that I have provided a device which achieves all the objects of my invention and is well adapted to meet the conditions of practical use.

As various possible embodiments might be made in the above invention, and as various changes might be made in the embodiment above set forth, it is to be understood that all matter herein described, or shown in the accompanying drawings, is to be interpreted as illustrative and not in a limiting sense.

Having thus described my invention, I claim as new and desire to secure by Letters Patent:

In a camera, a variable view finder offset from the optical axis of the camera, said view finder including a top and a plurality of parallax compensating top frame markers, each of said markers having a different characterizing color, said markers being visible in the view finder and being so positioned and dimensioned that the colors thereof are distinguishable in the view finder, means for detachably supporting a focussing lens, an index mark, a lens movably carried for focussing by said lens-supporting means, a distance scale movable with the lens and readable against the index mark to indicate the distance at which the lens is focussed, said scale covering a range of distances and comprising distance indicia specifying distance measurements of said range, said scale being sub-divided into a plurality of contiguous sections exceeding by one the number of top frame markers, each of said sections corresponding to and embracing only a sub-range less than the whole range, each of said sections except one being associated with a different one of the markers, the remaining section being associated with the top of the view finder, each of said marker-associated sections having a different characterizing color which is the same as the characterizing color of the associated marker, each of the marker-associated sections covering a sub-range of the distance scale corresponding to the distances at which the associated marker having the same characterizing color will give approximately correct parallax correction, and the remaining section covering a sub-range of the distance scale corresponding to distances at which the top of the view finder needs substantially no parallax correction.

RICHARD J. DONOVAN.

REFERENCES CITED

The following references are of record in the file of this patent:

UNITED STATES PATENTS

| Number | Name | Date |
| --- | --- | --- |
| 1,897,263 | Merle | Feb. 14, 1933 |
| 2,043,900 | Mihalyi | June 9, 1936 |
| 2,220,021 | Ort | Oct. 29, 1940 |
| 2,522,387 | Livens | Sept. 12, 1950 |